US 12,391,065 B2

(12) United States Patent
Yamamoto (10) Patent No.: US 12,391,065 B2
(45) Date of Patent: Aug. 19, 2025

(54) SPOKE WHEEL

(71) Applicant: SUZUKI MOTOR CORPORATION, Hamamatsu (JP)

(72) Inventor: Takayo Yamamoto, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 392 days.

(21) Appl. No.: 17/947,292

(22) Filed: Sep. 19, 2022

(65) Prior Publication Data

US 2023/0093387 A1 Mar. 23, 2023

(30) Foreign Application Priority Data

Sep. 21, 2021 (JP) ................. 2021-153507

(51) Int. Cl.
*B60B 1/04* (2006.01)
*B60B 21/06* (2006.01)

(52) U.S. Cl.
CPC .............. *B60B 1/041* (2013.01); *B60B 1/043* (2013.01); *B60B 21/062* (2013.01)

(58) Field of Classification Search
CPC ....... B60B 1/041; B60B 1/043; B60B 21/025; B60B 21/06; B60B 21/062; B60B 21/064; B60B 21/066; B60B 21/104
See application file for complete search history.

(56) References Cited

U.S. PATENT DOCUMENTS

| 1,222,094 A * | 4/1917 | Frommann ............. B60B 1/042 |
| | | 301/58 |
| 1,959,007 A * | 5/1934 | Schweitzer ........... B60B 1/0207 |
| | | 301/58 |
| 2,937,905 A * | 5/1960 | Altenburger .......... B60B 21/026 |
| | | 301/58 |
| 2013/0038117 A1* | 2/2013 | Miyamoto .............. B60B 1/043 |
| | | 301/56 |
| 2020/0062032 A1* | 2/2020 | Yamamoto .............. B60B 1/043 |

FOREIGN PATENT DOCUMENTS

| JP | 60-12314 A | 1/1985 | |
| JP | A 60-168601 | 11/1985 | |
| JP | H0639502 U * | 5/1994 | ............. B60B 21/06 |

OTHER PUBLICATIONS

Machine Translation of JP 60012314 A, 3 pages (Year: 1985).*
Machine Translation of JP H0639502 U, 6 pages (Year: 1994).*
Japanese Office Action dated May 7, 2025, issued by the Japanese Patent Office in corresponding application JP 2021-153507.

* cited by examiner

*Primary Examiner* — S. Joseph Morano
*Assistant Examiner* — Emily G. Castonguay
(74) *Attorney, Agent, or Firm* — Stein IP LLC (57) ABSTRACT

A spoke wheel for a straddle-type vehicle includes a rim having an outer peripheral surface on which a tire is mounted and an annular shape, a hub supported by an axle on an inner side of the rim and having a tubular shape, and a plurality of wire spokes connecting the rim to the hub. The rim is formed with a plurality of spoke holes through which the plurality of wire spokes pass and support surfaces receiving head portions of the plurality of wire spokes on one end sides of the plurality of spoke holes. Each of the support surfaces has a groove shape extending in a wheel rotation direction.

7 Claims, 5 Drawing Sheets

SPOKE WHEEL

CROSS-REFERENCE TO RELATED APPLICATIONS

The disclosure of Japanese Patent Application No. 2021-153507 filed on Sep. 21, 2021, including specification, drawings and claims is incorporated herein by reference in its entirety.

BACKGROUND

The present invention relates to a spoke wheel.

In an off-road type straddle-type vehicle, a spoke wheel is often used to absorb an impact during traveling. Spoke holes through which a large number of wire spokes pass are formed on a rim of the spoke wheel. As such a type of spoke wheel, a type in which spoke holes are formed on inner peripheral protruding portions protruding radially inward from a rim bottom surface, and a type in which spoke holes are formed on a flange protruding radially outward from a rim outer edge are known (for example, see Patent Literature 1). At the time of forming the spoke holes of the rim, counterboring is performed in order to accommodate head portions of the wire spokes.

Patent Literature 1: JP-A-S60-012314

SUMMARY

The present invention provides a spoke wheel fora straddle-ride type vehicle, the spoke wheel including: a rim having an outer peripheral surface on which a tire is mounted and an annular shape, a hub supported by an axle on an inner side of the rim and having a tubular shape; and a plurality of wire spokes connecting the rim to the hub, in which the rim is formed with a plurality of spoke holes through which the plurality of wire spokes pass and support surfaces receiving head portions of the plurality of wire spokes on one end sides of the plurality of spoke holes, and each of the support surfaces has a groove shape extending in a wheel rotation direction.

DESCRIPTION OF EMBODIMENTS

In the rim described in Patent Literature 1, counterboring must be performed on each spoke hole using a dedicated tool, and there is a problem that working man-hours increase and a manufacturing cost of the spoke wheel increases.

The present invention has been made in view of the above circumstances, and an object thereof is to provide a spoke wheel capable of reducing working man-hours and a manufacturing cost.

According to the spoke wheel of one aspect of the present invention, the head portions of the plurality of wire spokes are accommodated in the groove-shaped support surfaces. Since the support surface is formed in the groove shape, there is no need to perform counterboring on each of the plurality of spoke holes formed on the rim by using a dedicated tool. Therefore, working man-hours at the time of molding the rim and the cost can be reduced.

A spoke wheel according to an aspect of the present invention is used in a straddle-ride type vehicle and includes an annular rim having an outer peripheral surface on which a tire is mounted, a tubular hub supported by an axle on an inner side of the rim, and a plurality of wire spokes connecting the rim to the hub. The rim is formed with a plurality of spoke holes through which the plurality of wire spokes pass, and support surfaces that receive head portions of the plurality of wire spokes on one end sides of the plurality of spoke holes are each formed in a groove shape extending in a wheel rotation direction. According to the configuration, the head portions of the plurality of wire spokes are accommodated in the groove-shaped support surfaces. Since the support surface is formed in the groove shape, there is no need to perform counterboring on each of the plurality of spoke holes formed on the rim by using a dedicated tool. Therefore, working man-hours at the time of molding the rim and the cost can be reduced.

EMBODIMENT

Figure 1:
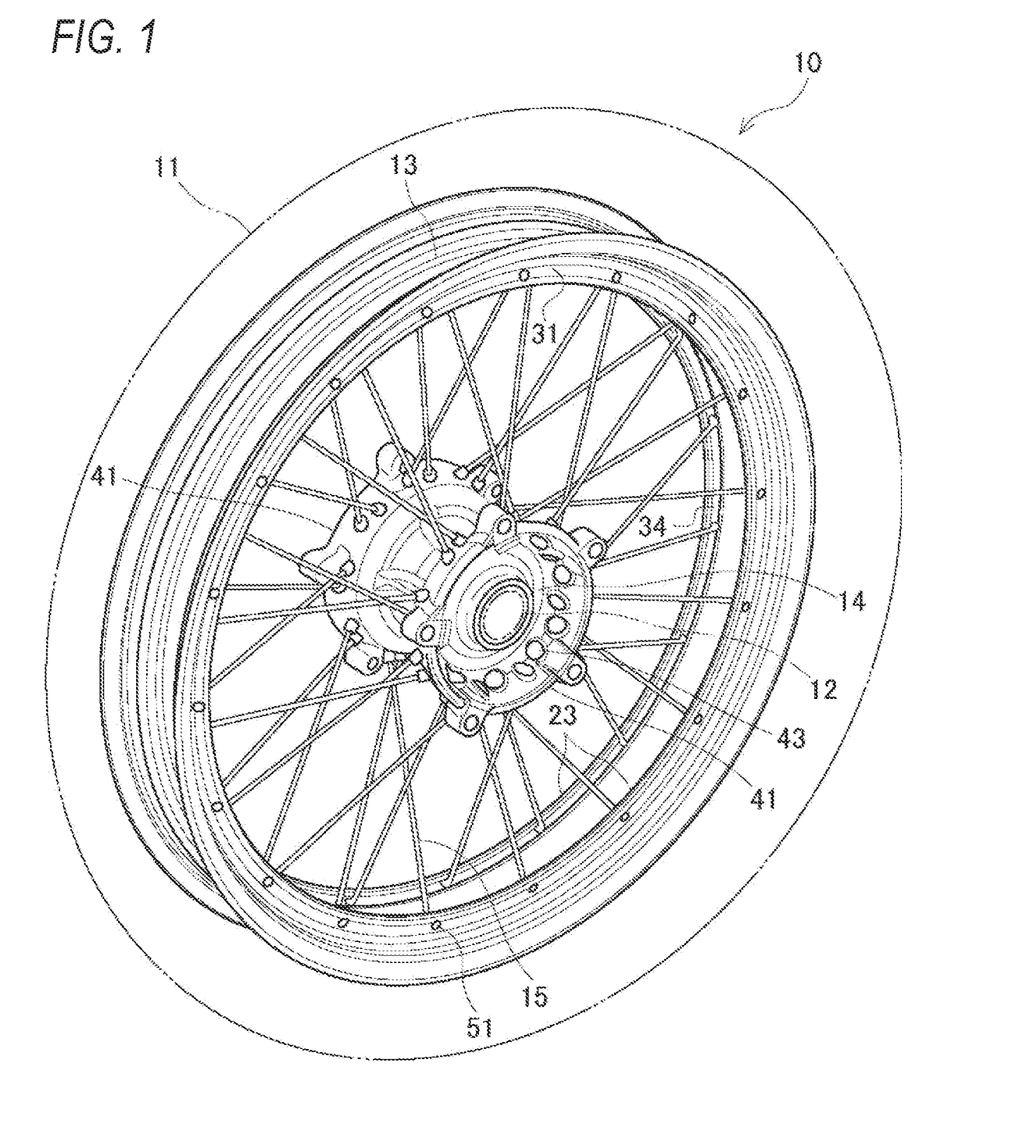
FIG. 1 is a perspective view of a spoke wheel according to the present embodiment.

Hereinafter, an embodiment will be described in detail with reference to the accompanying drawings. FIG. 1 is a perspective view of a spoke wheel according to the present embodiment. In the following drawings, an arrow FR indicates a forward direction, an arrow RE indicates a rearward direction, an arrow L indicates a left direction, and an arrow R indicates a right direction.

As illustrated in FIG. 1, a spoke wheel 10 of the present embodiment is a spoke wheel for a tubeless tire of a straddle-ride type vehicle. The spoke wheel 10 includes an annular rim 13 having an outer peripheral surface on which a tire 11 is mounted, a tubular hub 14 supported by an axle 12 on an inner side of the rim 13, and a plurality of wire spokes 15 connecting the rim 13 to the hub 14. The plurality of wire spokes 15 extend substantially radially from the hub 14 toward the rim 13, and a load acting on the spoke wheel 10 is supported by a tension of the plurality of wire spokes 15. The spoke wheel 10 absorbs an impact during traveling and reduces a weight of wheels.

A pair of inner peripheral protruding portions 23 protruding radially inward from an inner peripheral surface of the rim 13, and spoke holes 26 (see FIG. 3) through which the plurality of wire spokes 15 pass are formed on the pair of inner peripheral protruding portions 23. A pair of flanges 41 protrude radially outward from both end portions, in an axle direction, of the hub 14, and a plurality of spoke nipples 43 for holding the plurality of wire spokes 15 are attached to the pair of flanges 41. Head portions 51 of the plurality of wire spokes 15 are hooked to the pair of inner peripheral protruding portions 23, and tip end portions of the plurality of wire spokes 15 are screwed to the plurality of wire spokes 15 of the pair of flanges 41.

The rim 13 of the spoke wheel 10 is molded by extrusion. In order to form a counterbore hole on one end sides of the spoke holes 26 of the rim 13, counterboring must be performed on each spoke hole 26. Further, in order to chamfer the other end sides of the spoke holes 26 of the rim 13, chamfering must be performed on each spoke hole 26. Therefore, in the spoke wheel 10 of the present embodiment, the groove shape in the wheel rotation direction is formed at the time of molding the rim 13 by extrusion. This groove shape is used in place of the counterbore hole formed by counterboring and the chamfered surface formed by chamfering, thereby reducing the working man-hours.

Figure 2:
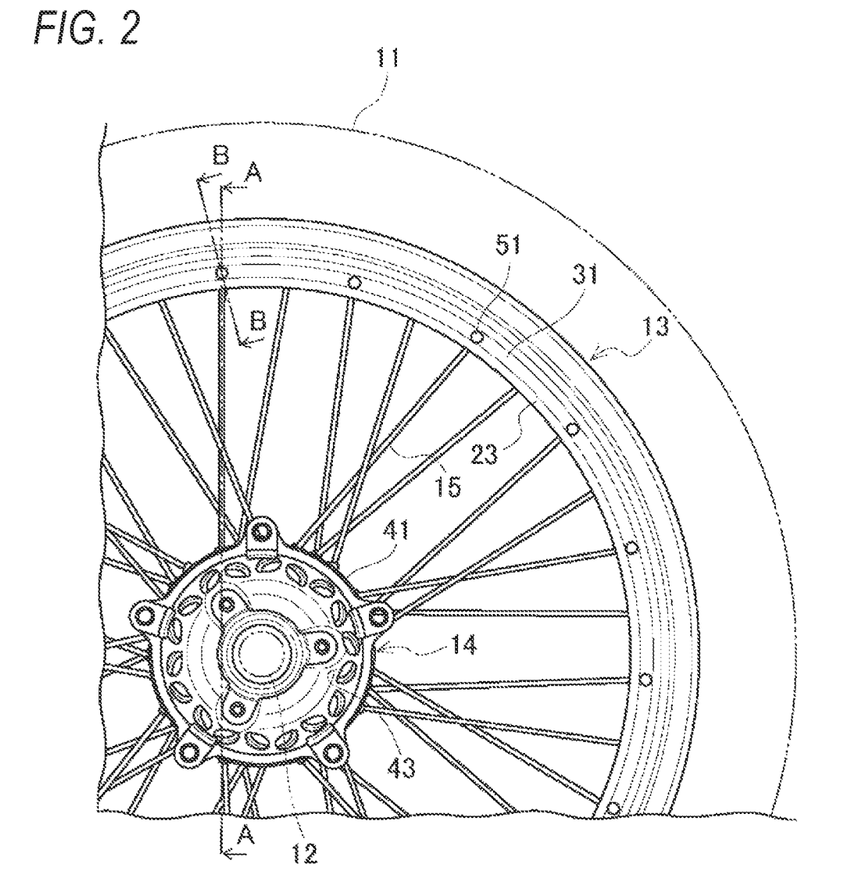
FIG. 2 is a side view of the spoke wheel according to the present embodiment.
Figure 3:
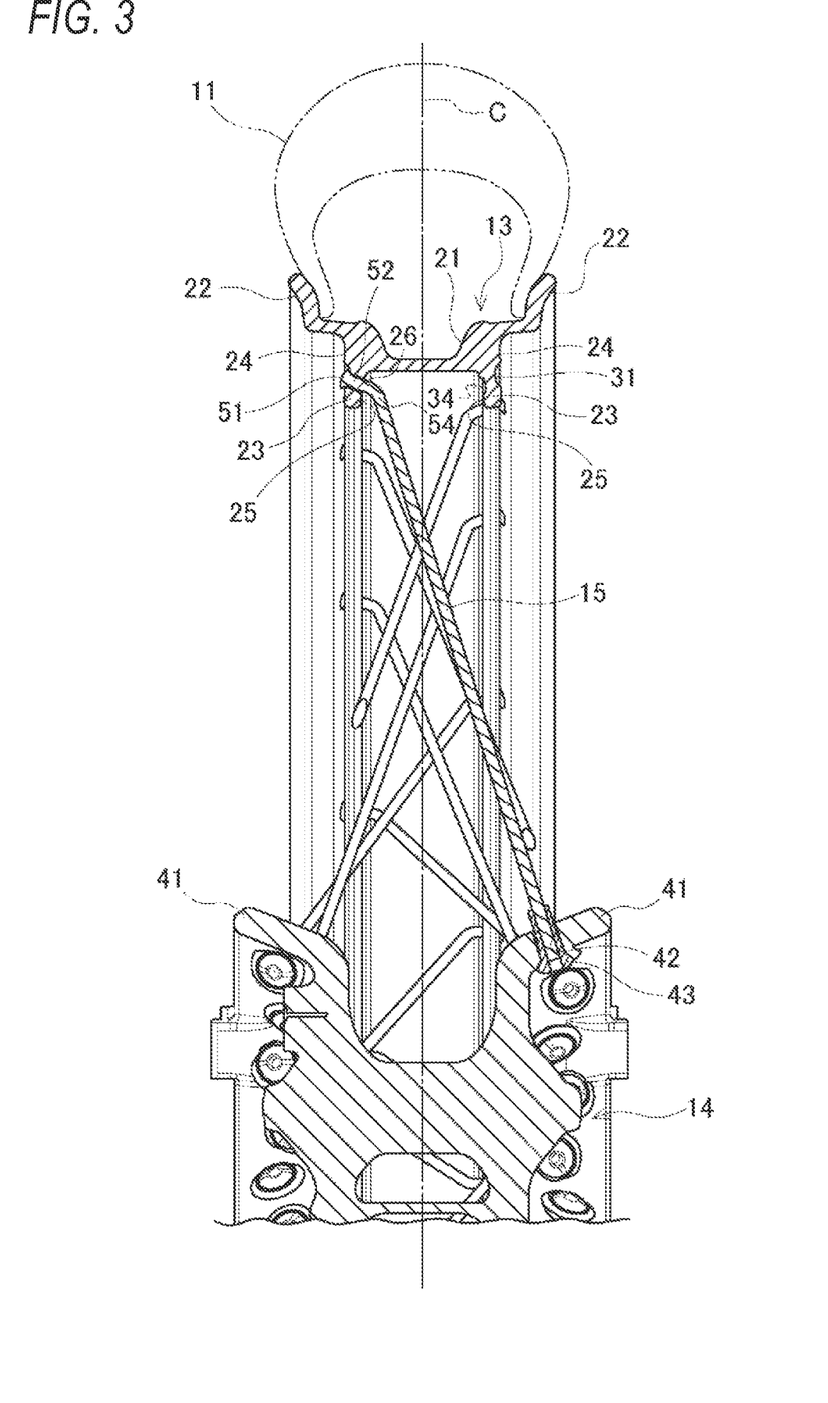
FIG. 3 is a cross-sectional view of the spoke wheel of FIG. 2 taken along a line A-A.
Figure 4:
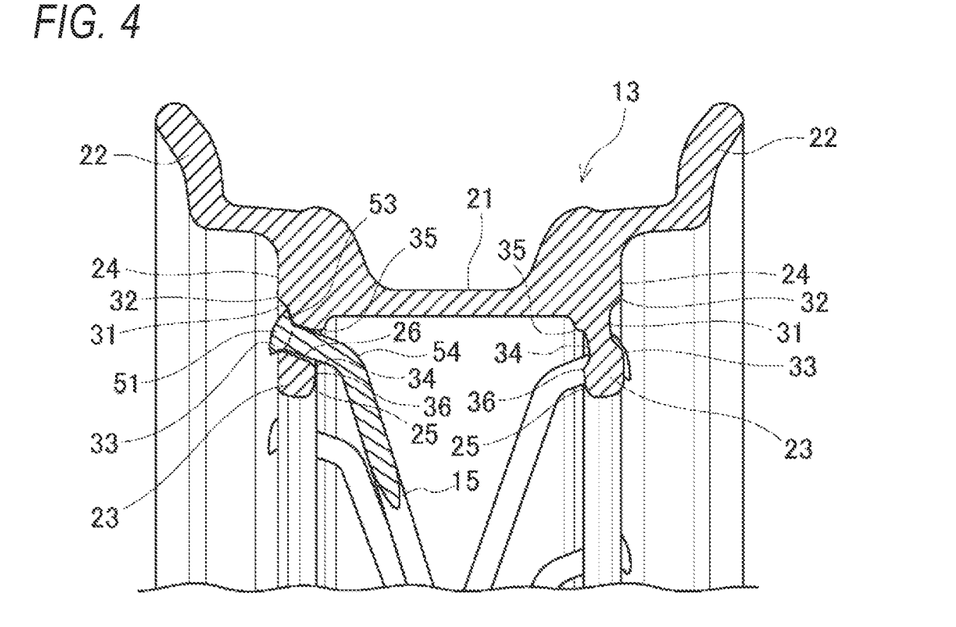
FIG. 4 is a cross-sectional view of the spoke wheel of FIG. 2 taken along a line B-B.

A detailed configuration of the spoke wheel will be described with reference to FIGS. 2 to 4. FIG. 2 is a side view of the spoke wheel according to the present embodiment. FIG. 3 is a cross-sectional view of the spoke wheel of FIG. 2 taken along a line A-A. FIG. 4 is a cross-sectional view of the spoke wheel of FIG. 2 taken along a line B-B.

As illustrated in FIGS. 2 and 3, a bottom wall 21 of the rim 13 is formed in a stepped shape in which a center thereof in the axle direction is recessed. A pair of outer peripheral protruding portions 22 protrude radially outward from both ends of the bottom wall 21 in the axle direction, and beads of the tire 11 are fitted inside the pair of outer peripheral protruding portions 22. The pair of inner peripheral protruding portions 23 are separated from each other across the center of the bottom wall 21, and the pair of inner peripheral protrusions 23 protrude in a rail shape from the inner peripheral surface of the bottom wall 21. The plurality of spoke holes 26 are formed with the pair of inner peripheral protruding portions 23, and the plurality of wire spokes 15 are passed through the plurality of spoke holes 26 from outer side surfaces 24 of the pair of inner peripheral protruding portions 23 on an outer side in the axle direction to inner side surfaces 25 of the pair of inner peripheral protruding portions 23 on an inner side in the axle direction.

The head portion 51 of the wire spoke 15 abuts against the outer side surface 24 of the inner peripheral protruding portion 23, and a neck portion 52 of the wire spoke 15 enters the spoke hole 26. The wire spoke 15 is bent in the vicinity of the inner side surface 25 of the inner peripheral protruding portion 23, and a tip end side of the wire spoke 15 extends linearly and radially inward. A portion from the head portion 51 to a bent portion 54 of the wire spoke 15 is shallowly inclined toward a hub 14 side, and a portion of the wire spoke 15 closer to the tip end side than the bent portion 54 is deeply inclined toward the hub 14. The wire spoke 15 obliquely crosses a center line C in the axle direction of the rim 13 from the inner peripheral protruding portion 23 on one side in the axle direction of the rim 13 toward the flange 41 on the other side in the axle direction of the hub 14.

In a cross-sectional view, the pair of flanges 41 of the hub 14 are formed such that the pair of flanges 41 is orthogonal to an extending direction of the tip end side of the wire spoke 15. A plurality of nipple holes 42 are formed on the pair of flanges 41 of the hub 14, and a plurality of spoke nipples 43 are attached to the plurality of nipple holes 42. A screw hole is formed on the spoke nipple 43, and a male screw at a tip end of the wire spoke 15 is screwed into the screw hole of the spoke nipple 43. A slit is formed on the head portion of the spoke nipple 43, and tension of the wire spoke 15 is adjusted by tightening the spoke nipple 43 to the tip end of the wire spoke 15.

As illustrated in FIGS. 2 and 4, support surfaces 31 that receive the head portions 51 of the plurality of wire spokes 15 on one end sides of the plurality of spoke holes 26 are formed on the outer side surfaces 24 of the pair of inner peripheral protruding portions 23, respectively. The support surfaces 31 each have a groove shape formed on the outer side surface 24 of the inner peripheral protruding portion 23 during the extrusion molding of the rim 13. The support surface 31 extends in the wheel rotation direction along a circular shape around the axle 12, and the head portions 51 of the plurality of wire spokes 15 arranged in the wheel rotation direction are hooked to the support surface 31. The head portion 51 of the wire spoke 15 is accommodated in the groove-shaped support surface 31, and a protruding amount of the head portion 51 of the wire spoke 15 is suppressed.

In a cross-sectional view, a groove width of the support surface 31 is formed to be larger than a diameter of the spoke hole 26, and the support surface 31 is inclined such that the groove width is narrowed toward a groove bottom. In the present embodiment, the support surface 31 is formed in an arc groove shape in the cross-sectional view, and one end of the spoke hole 26 is opened closer to an inner edge 33 side of the support surface 31 than to an outer edge 32 side of the support surface 31. Bottom surfaces 53 of the head portions 51 of the plurality of wire spokes 15 are each formed in a tapered shape. Accordingly, even when an error occurs in a taper angle of the bottom surface 53 of the head portion 51 of the wire spoke 15, the tapered bottom surface 53 of the head portion 51 is easily and stably supported by the support surface 31 having the arc groove shape.

Chamfered surfaces 34 are formed on the inner side surfaces 25 of the pair of inner peripheral protruding portions 23, and are continuous with opening edges of the plurality of spoke holes 26 on the other end sides of the plurality of spoke holes 26, respectively. The chamfered surface 34 has a groove shape formed on the inner side surface 25 of the inner peripheral protruding portion 23 during the extrusion molding of the rim 13. The chamfered surface 34 extends in the wheel rotation direction along a circular shape centered on the axle 12, and sharp edges of the opening edges of the plurality of spoke holes 26 arranged in the wheel rotation direction are eliminated by the chamfered surface 34. The sharp edge of the opening edge of the spoke hole 26 does not come into contact with the wire spoke 15, and stress concentration on the wire spoke 15 is alleviated.

In the cross-sectional view, a groove width of the chamfered surface 34 is formed to be larger than the diameter of the spoke hole 26, and the chamfered surface 34 is inclined such that the groove width is narrowed toward the groove bottom. In the present embodiment, the chamfered surface 34 is formed in a trapezoidal groove shape in the cross-sectional view, and the other end of the spoke hole 26 is opened at a center of an outer edge 35 and an inner edge 36 of the chamfered surface 34. The opening edge of the spoke hole 26 is continuous with an inclined surface of the chamfered surface 34, so that a periphery of the spoke hole 26 is formed in a chamfered shape. Note that the periphery of the spoke hole 26 may be formed in a rounded shape by changing the groove shape of the chamfered surface 34.

An inlet to the spoke hole 26 is widened by the support surface 31, and an outlet from the spoke hole 26 is widened by the chamfered surface 34. Since the wire spoke 15 is easily inserted into the spoke hole 26, a degree of freedom of a spoke shape of the wire spoke 15 is improved by increasing a bending angle of the bent portion 54 of the wire spoke 15 or increasing a bending radius of the bent portion 54 of the wire spoke 15. Further, a strength of the pair of inner peripheral protruding portions 23 can be improved by increasing a thickness of the pair of inner peripheral protruding portions 23, and a decrease in the strength of the inner peripheral protruding portions 23 due to the groove shapes of the support surface 31 and the chamfered surface 34 can be suppressed.

During the extrusion molding of the rim 13, the groove-shaped support surfaces 31 are formed on the outer side surfaces 24 of the pair of inner peripheral protruding portions 23 respectively, and the groove-shaped chamfered surfaces 34 are formed on the inner side surfaces 25 of the pair of inner peripheral protruding portions 23 respectively. Then, drilling is performed from the outer side surface 24 side of the inner peripheral protruding portion 23, and the plurality of spoke holes 26 are formed from the support surface 31 toward the chamfered surface 34. Counterboring and chamfering on each spoke hole 26 become unnecessary, and working man-hours are reduced. In particular, in the chamfering, when a tool is brought into contact with the inner side surface 25 of one inner peripheral protruding portion 23, the other inner peripheral protruding portion 23 becomes an obstacle, but the chamfered surface 34 is formed by extrusion molding, so that workability is not deteriorated.

As described above, according to the present embodiment, the head portions 51 of the plurality of wire spokes 15 are accommodated in the groove-shaped support surfaces 31. Since the support surface 31 is formed in the groove shape, there is no need to perform counterboring on each of the plurality of spoke holes 26 formed on the rim 13 by using a dedicated tool. The chamfered surface 34 eliminates the sharp edge of the opening edge of the spoke hole 26, and stress concentration on the plurality of wire spokes 15 is alleviated. Further, since the chamfered surface 34 is formed in the groove shape, there is no need to perform chamfering on each of the plurality of spoke holes 26 formed on the rim 13. Therefore, working man-hours at the time of molding the rim 13 and the cost can be reduced.

In the present embodiment, the plurality of spoke holes are formed on the pair of inner peripheral protruding portions provided on the inner peripheral surface of the rim, but the pair of inner peripheral protruding portions may not be provided on the rim. For example, as illustrated in a first modification of FIG. 5, a pair of outer peripheral protruding portions 62 may protrude radially outward from both ends of a rim 61 in the axle direction, and a plurality of spoke holes 63 may be formed on the pair of outer peripheral protruding portions 62. In this case, the pair of outer peripheral protruding portions 62 are formed to be wide, and the plurality of spoke holes 63 penetrate the pair of outer peripheral protruding portions 62 in a radial direction. A support surface 66 is formed on an outer peripheral surface of the outer peripheral protruding portion 62, and a chamfered surface 67 is formed on an inner peripheral surface of the outer peripheral protruding portion 62.

Figure 5:
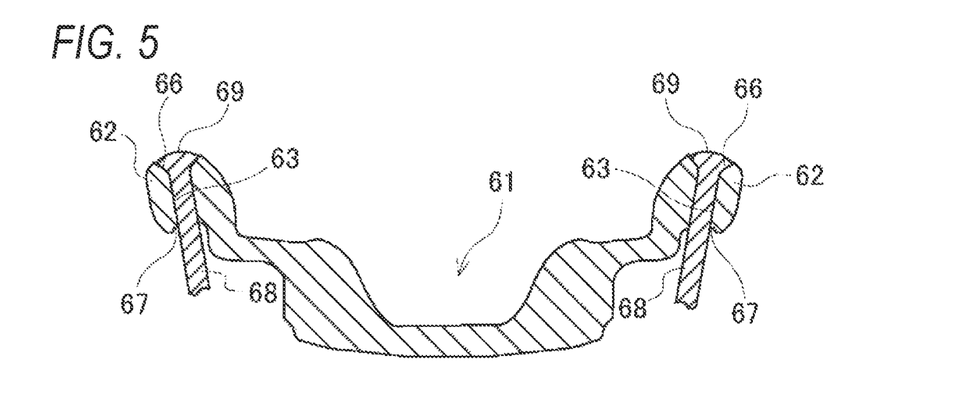
FIG. 5 is a schematic cross-sectional view of a spoke wheel according to a first modification.

The support surface 66 and the chamfered surface 67 are each formed in a groove shape formed during extrusion molding of the rim 61 as in the present embodiment. A head portion 69 of a wire spoke 68 is hooked on one end side of the spoke hole 63 by the support surface 66, and a sharp edge of an opening edge of the spoke hole 63 on the other end side of the spoke hole 63 is eliminated by the chamfered surface 67. Even in the configuration illustrated in the modification, since the support surface 66 and the chamfered surface 67 are formed during the extrusion molding of the rim 61, counterboring and chamfering on each of the plurality of spoke holes 63 become unnecessary. Therefore, working man-hours at the time of molding the rim 61 and the cost can be reduced.

Further, in the present embodiment, the pair of inner peripheral protruding portions are provided on the inner peripheral surface of the rim, but a single inner peripheral protruding portion may be provided on the inner peripheral surface of the rim. For example, as illustrated in a second modification of FIG. 6, a single inner peripheral protruding portion 72 may protrude radially inward from a center of an inner peripheral surface of a rim 71 in the axle direction, and a plurality of spoke holes 73 may be formed on the inner peripheral protruding portion 72. In this case, the inner peripheral protruding portion 72 is formed to be wide, and a plurality of spoke holes 73 penetrate the inner peripheral protruding portion 72 in the axle direction. A pair of support surfaces 75 are formed on both side surfaces 74 of the inner peripheral protruding portion 72, and the pair of support surfaces 75 also function as chamfered surfaces.

Figure 6:
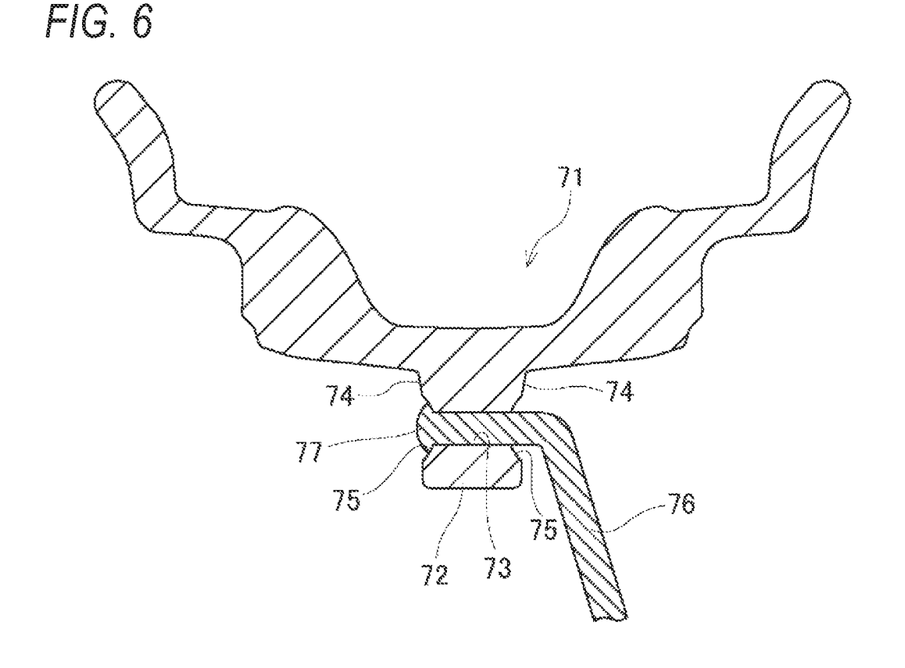
FIG. 6 is a schematic cross-sectional view of a spoke wheel according to a second modification.

The pair of support surfaces 75 are each formed in a groove shape formed at the time of extrusion molding of the rim 71 as in the present embodiment. A head portion 77 of a wire spoke 76 is hooked on one end side of the spoke hole 73 by one support surface 75, and a sharp edge of an opening edge of the spoke hole 73 on the other end side of the spoke hole 73 is eliminated by the other support surface 75. Even in the configuration illustrated in the modification, since the pair of support surfaces 75 are formed at the time of extrusion molding of the rim 71, counterboring and chamfering on each of the plurality of spoke holes 73 become unnecessary. Therefore, working man-hours at the time of molding the rim 71 and the cost can be reduced.

Figure 7:
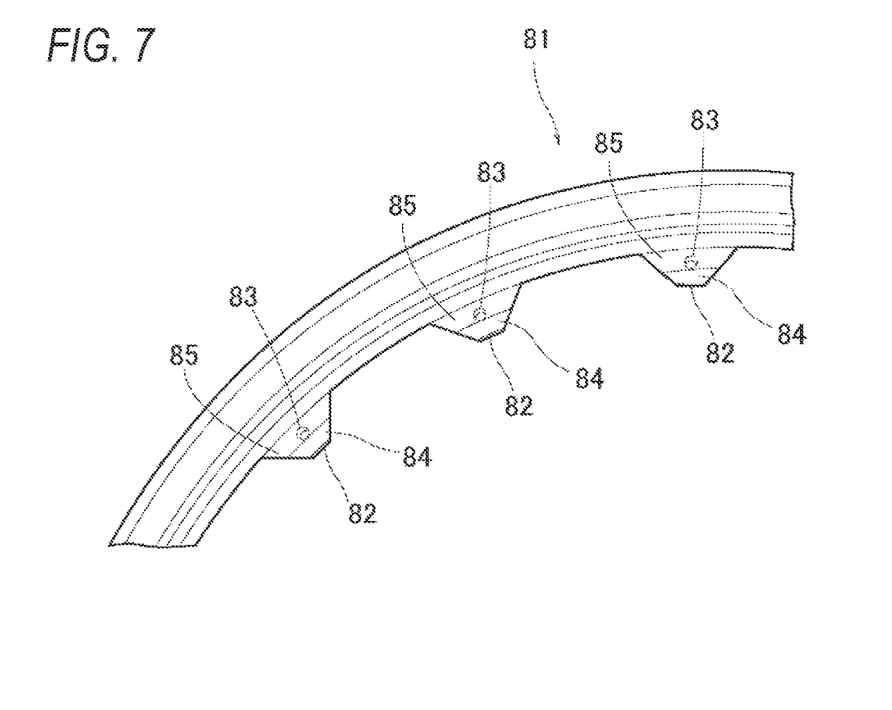
FIG. 7 is a perspective view of a spoke wheel according to a third modification.

Further, in the present embodiment, the inner peripheral protruding portion is provided on the inner peripheral surface of the rim over the entire periphery, but the inner peripheral protruding portion may be partially provided on the inner peripheral surface of the rim. For example, as illustrated in a third modification of FIG. 7, a large number of inner peripheral protruding portions 82 may be arranged along an inner peripheral surface of the rim 81. In this case, spoke holes 83 are formed on the respective inner peripheral protruding portions 82, and the plurality of spoke holes 83 penetrate the inner peripheral protruding portions 82 in the axle direction. Further, as in the present embodiment, a support surface 85 that receives the head portion 51 of the wire spoke 15 on one end side of the spoke hole 83 is formed on an outer side surface 84 of the inner peripheral protruding portion 82. Alternatively, although not illustrated, as in the second modification, a pair of support surfaces may be formed on both side surfaces of a large number of inner peripheral protruding portions arranged in a row along an inner peripheral surface of a rim, and the pair of support surfaces also function as chamfered surfaces.

Although the spoke wheel for a tubeless tire is exemplified in the present embodiment, the spoke wheel may be a spoke wheel for a tube tire. In this case, the spoke holes may be formed on the bottom wall of the rim, and the inner peripheral protruding portions may not be formed on the rim.

Further, in the present embodiment, the groove-shaped support surfaces and chamfered surfaces are formed at the time of extrusion molding of the rim, but a method of forming the groove-shaped support surfaces and chamfered surfaces is not limited. For example, the groove-shaped support surfaces and chamfered surfaces may be formed by cutting after extrusion molding of the rim.

Further, in the present embodiment, the groove-shaped support surfaces and chamfered surfaces are formed on the rim, but at least the groove-shaped support surfaces may be formed on the rim.

Further, in the present embodiment, the support surface is formed in an arc groove shape in the cross-sectional view, but the support surface may be formed in a groove shape that receives the head portion of the wire spoke. For example, the support surface may be formed in a square groove shape in the cross-sectional view.

The spoke wheel is not limited to the straddle-type vehicle, and may be adopted in other vehicles. The straddle-type vehicle is not limited to a motorcycle, and also includes a bicycle.

As described above, a spoke wheel (10) of the present embodiment is a spoke wheel used in a straddle-ride type vehicle, the spoke wheel (10) including: an annular rim (13) having an outer peripheral surface on which a tire (11) is mounted, a tubular hub (14) supported by an axle (12) on an inner side of the rim; and a plurality of wire spokes (15) connecting the rim to the hub, in which the rim is formed with a plurality of spoke holes (26) through which the plurality of wire spokes pass, and support surfaces (31) that receive head portions of the plurality of wire spokes on one end sides of the plurality of spoke holes, and the support surfaces are each formed in a groove shape extending in a wheel rotation direction. According to the configuration, the head portions of the plurality of wire spokes are accommodated in the groove-shaped support surfaces. Since the support surface is formed in the groove shape, there is no need to perform counterboring on each of the plurality of spoke holes formed on the rim by using a dedicated tool. Therefore, working man-hours at the time of molding the rim and a cost can be reduced.

In the spoke wheel of the present embodiment, in a cross-sectional view, the support surface is inclined such that a groove width is narrowed toward a groove bottom, and bottom surfaces (53) of the head portions of the plurality of wire spokes are each formed in a tapered shape. According to this configuration, the tapered bottom surface of the head portion of the wire spoke is stably supported by an inclined surface of the support surface.

In the spoke wheel of the present embodiment, the support surface is formed in an arc groove shape in the cross-sectional view. According to this configuration, even when an error occurs in a taper angle of the bottom surface of the head portion of the wire spoke, the tapered bottom surface of the head portion of the wire spoke is easily and stably supported by the support surface.

In the spoke wheel of the present embodiment, the rim has chamfered surfaces (34) connected to opening edges of the plurality of spoke holes on the other end side of the plurality of spoke holes, and the chamfered surfaces are each formed in a groove shape extending in the wheel rotation direction. According to this configuration, sharp edges of the opening edges of the spoke holes are eliminated, and stress concentration on the plurality of wire spokes is alleviated. Further, since the chamfered surface is formed in the groove shape, there is no need to perform chamfering on each of the plurality of spoke holes formed on the rim. Therefore, the working man-hours at the time of molding the rim and the cost can be reduced.

In the spoke wheel of the present embodiment, an inner peripheral protruding portion (23) protrudes radially inward from an inner peripheral surface of the rim, and the plurality of spoke holes and support surface are formed on the inner peripheral protruding portion. According to this configuration, the inner peripheral protruding portion of the rim and the hub are connected to each other by the wire spoke of which a head portion side is bent.

In the spoke wheel of the present embodiment, the inner peripheral protruding portions are a pair of inner peripheral protruding portions separated from each other in an axle direction, the plurality of spoke holes through which the plurality of wire spokes pass are formed on the pair of inner peripheral protruding portions from outer side surfaces on an outer side in the axle direction to inner side surfaces on an inner side in the axle direction, the support surfaces that receive the head portions of the plurality of wire spokes on one end sides of the plurality of spoke holes are formed on outer side surfaces (24) of the pair of inner peripheral protruding portions respectively, and the chamfered surfaces that are continuous with opening edges of the plurality of spoke holes on the other end sides of the plurality of spoke holes are formed on inner side surfaces (25) of the pair of inner peripheral protruding portions. According to this configuration, counterboring on each spoke hole in the outer side surface of the pair of inner peripheral protruding portions is unnecessary, and chamfering on each spoke hole in the inner side surface of the pair of inner peripheral protruding portions becomes unnecessary. In particular, since the chamfered surface is formed at the time of extrusion molding of the rim, unlike general chamfering, when the chamfered surface is formed on the inner side surface of one inner peripheral protruding portion, the other inner peripheral protruding portion does not become an obstacle.

Although the present embodiment has been described, a part or all of the above-described embodiment and modifications may be combined as another embodiment.

The technique of the present invention is not limited to the above-described embodiment, and various changes, substitutions and modifications may be made without departing from the spirit of the technical idea of the present invention. The present invention may be implemented by other methods as long as the technical idea can be implemented by the methods through advance of the technique or other derivative techniques. Accordingly, the claims cover all embodiments that may be included within the scope of the technical idea.

What is claimed is:

1. A spoke wheel for a straddle-type vehicle, comprising:
   a rim having an outer peripheral surface on which a tire is mounted and an annular shape;
   a hub supported by an axle on an inner side of the rim and having a tubular shape; and
   a plurality of wire spokes connecting the rim to the hub,
   wherein the rim is formed with a plurality of spoke holes through which the plurality of wire spokes pass and a plurality of support surfaces each receiving head portions of the plurality of wire spokes on one end sides of the plurality of spoke holes,
   wherein each of the plurality of support surfaces has a groove extending in a wheel rotation direction, there being a plurality of grooves,
   wherein two or more of the plurality of spoke holes are formed in a common groove among the plurality of grooves, and
   wherein two or more of the head portions of the plurality of wire spokes are accommodated in a common groove support surface having the common groove.

2. The spoke wheel according to claim 1,
   wherein in a cross-sectional view, each of the support surfaces is inclined such that a groove width is narrowed toward a groove bottom, and
   wherein each of bottom surfaces of the head portions of the plurality of wire spokes has a tapered shape.

3. The spoke wheel according to claim 2,
   wherein in the cross-sectional view, each of the support surfaces has an arc groove shape.

4. The spoke wheel according to claim 1,
wherein the rim has chamfered surfaces being continuous with opening edges of the plurality of spoke holes on the other end sides of the plurality of spoke holes, and
wherein each of the chamfered surfaces has a groove shape-extending in a wheel rotation direction.

5. The spoke wheel according to claim 4,
wherein an inner peripheral protruding portion protrudes radially inward from an inner peripheral surface of the rim, and
wherein the plurality of spoke holes and the support surfaces are formed with the inner peripheral protruding portion.

6. The spoke wheel according to claim 5,
wherein the inner peripheral protruding portion includes a pair of inner peripheral protruding portions separated from each other in an axle direction,
wherein the plurality of spoke holes, through which the plurality of wire spokes pass from outer side surfaces on an outer side in the axle direction to inner side surfaces on an inner side in the axle direction, are formed with the pair of inner peripheral protruding portions,
wherein the support surfaces, receiving the head portions of the plurality of wire spokes on one end sides of the plurality of spoke holes, are formed with outer side surfaces of the pair of inner peripheral protruding portions, and
wherein the chamfered surfaces, being continuous with the opening edges of the plurality of spoke holes on the other end sides of the plurality of spoke holes, are formed with inner side surfaces of the pair of inner peripheral protruding portions.

7. The spoke wheel according to claim 1, wherein the plurality of spoke holes and the plurality of support surfaces are molded by extrusion.

* * * * *